United States Patent [19]

Killat et al.

[11] Patent Number: 4,871,779
[45] Date of Patent: Oct. 3, 1989

[54] ION EXCHANGE/CHELATION RESINS CONTAINING DENSE STAR POLYMERS HAVING ION EXCHANGE OR CHELATE CAPABILITIES

[75] Inventors: George R. Killat; Donald A. Tomalia, both of Midland, Mich.

[73] Assignee: The Dow Chemical Company, Midland, Mich.

[21] Appl. No.: 812,479

[22] Filed: Dec. 23, 1985

[51] Int. Cl.$^4$ ............................................. C08D 5/20
[52] U.S. Cl. ..................................................... 521/28
[58] Field of Search .................................... 521/28, 38

[56] References Cited

U.S. PATENT DOCUMENTS

| | | | |
|---|---|---|---|
| 4,031,038 | 6/1977 | Grinstead et al. | 423/24 |
| 4,195,138 | 3/1980 | Ward | 525/404 |
| 4,507,466 | 3/1985 | Tomalia et al. | 528/332 |
| 4,558,120 | 12/1985 | Tomalia et al. | 528/363 |
| 4,587,329 | 5/1986 | Tomalia et al. | 528/363 |

Primary Examiner—Joseph L. Schofer
Assistant Examiner—Peter F. Kulkosky

[57] ABSTRACT

Ion exchange resins and chelate resins are provided with ion exchange or chelate capability by depositing on an insoluble substrate dense star polymers having terminal group densities greater than conventional star polymers exhibiting greater and more uniform reactivity than their corresponding conventional star polymers. For example, a third generation, amine-terminated polyamidoamine dense star polymer prepared from ammonia, methyl acrylate and ethylenediamine having $1.24 \times 10^{-4}$ amine moieties per unit volume (cubic Angstrom units) in contrast to the $1.58 \times 10^{-6}$ amine moieties per unit volume contained by a conventional star polymer can be reacted with a chloromethylated styrene/divinyl copolymer (insoluble substrate) to form a desirably weak base anion exchange resin.

22 Claims, No Drawings

ION EXCHANGE/CHELATION RESINS CONTAINING DENSE STAR POLYMERS HAVING ION EXCHANGE OR CHELATE CAPABILITIES

BACKGROUND OF THE INVENTION

This invention relates to a novel class of ion exchange and chelation polymers which contain dendritic branches having ion exchanging or chelating moieties uniformly distributed on the periphery of such branches. The invention also relates to processes for using such polymers as ion exchange resins and chelate resins.

Ion exchange resins are widely used to remove ions from aqueous media, and for a wide variety of other purposes. For example, such resins are used in water treatment including softening brackish waters, dealkalization, demineralization, condensate polishing, and nitrate removal; waste treatment such as treatment of radioactive waste streams, chromate recovery and rinse water recycling. Such resins are also useful in chemical processing such as catalysis purification, metal extraction, ion-exclusion purification, ion retardation, and desiccation; sugar separation and purification such as glucose/fructose separation and sucrose decolorization and deashing; and chemical analysis. Cation exchange resins ar those having a negatively charged matrix and exchangeable positive ions, e.g., strong acid resins such as sulfonated polymers of styrene crosslinked with varying degrees of divinylbenzene and weak acid resins such as polymers of acrylic acid or methacrylic acid that are crosslinked with divinylbenzene. Anion exchange resins have a positively charged matrix and exchangeable negative ions, e.g., strong base resins such as quaternary ammonium salt forms of polyvinyl benzyl chloride which has been crosslinked with divinylbenzene and weak base resins such as epichlorohydrin amine condensates that bear primary, secondary or tertiary amine moieties. The most effective ion exchange resins have good capacities, i.e., the ability to exchange large numbers of ions before needing to be regenerated. Such resins also should have good crush strength, i.e., the ability to resist breakage resulting from handling or osmotic shocks which often occurs during regeneration.

While the standard ion exchange resins are effective for essentially total removal of ions from solutions, they generally do not function well in the selective removal of heavy metal ions from solutions containing significant quantities of alkali and alkaline earth metal ions. Accordingly, chelate resins have been developed to selectively remove the heavy metal ions from such salt solutions. Chelate resins are normally solid chelating agents which have the ability to extract metal ions from a liquid without substantial structural alteration of the solid resin. The most effective chelate resins possess the capacity to chelate with a large number of metal ions before the need for regeneration, i.e., preparing the resin for reuse by displacing the metal ions removed by the resin. They also advantageously exhibit a high porosity and are resistant to physical deterioration such as excessive swelling or shattering. Moreover, to obtain maximum benefit of the resin's properties, a spheroidal particle size is often desirable.

Heretofore, chelate resins have been conventionally prepared by the addition of chelate active functional groups to an insoluble resin matrix such as a crosslinked vinyl aromatic polymer, e.g., a crosslinked polystyrene. A method for adding chelate active groups to such resins by the sequential steps of halomethylation amination and carboxylation is disclosed in *Ion Exchange*, by F. Helfferich, published in 1962 by McGraw-Hill Book Company, New York. Alternatively, the chelating groups are added to such resins by the reaction of halomethylated resin with an appropriate reactant such as a nitrile-containing amine and the hydrolysis of the reacted product. See, for example, U.S. Pat. No. 3,043,809 to Mattano. Unfortunately, such methods require numerous process steps, each of which require relatively exacting control to prevent unwanted side reactions. Moreover, the resins prepared by such methods possess relatively low chelate stability constants with many multivalent cations.

In view of the extensive use of ion exchange resins and chelate resins on a commercial scale, it is highly desirable to provide new resins that are more efficiently produced and/or used.

SUMMARY OF THE INVENTION

In one aspect, the present invention is an ion exchange resin comprising a normally solid, water-insoluble substrate having deposited thereon or chemically bonded thereto a dense star polymer. The dense star polymer has at least one dendritic branch emanating from a core with each dendritic branch having at least two terminal ion exchange moieties and further provided that, (1) the ratio of terminal ion exchange groups to the core branches is two or greater, (2) the density of terminal ion exchange groups per unit volume in the polymer is at least 1.5 times that of an extended conventional star polymer having similar core and monomeric moieties and a comparable molecular weight and number of core branches, each of such branches of the extended conventional star polymer bearing only one terminal group, and (3) a molecular volume that is no more than about 80 percent of the molecular volume of said extended conventional star polymer as determined by dimensional studies using scaled Corey-Pauling molecular models.

In another aspect, this invention is a chelate resin comprising a normally solid, water-insoluble substrate having deposited thereon or chemically bonded thereto a dense star polymer. The dense star polymer has at least one dendritic branch emanating from a core with each dendritic branch having at least two terminal chelate moieties and further provided that (1) the ratio of terminal chelate groups to the core branches is two or greater, (2) the density of terminal chelate groups per unit volume is at least 1.5 times that of an extended conventional star polymer having similar core and monomeric moieties and a comparable molecular weight and number of core branches, each of such branches of the extended conventional star polymer bearing only one terminal group, and (3) a molecular volume that is no more than about 80 percent of the molecular volume of said extended conventional star polymer as determined by dimensional studies using scaled Corey-Pauling molecular models.

For purposes of this invention, the term "dense" as it modifies "star polymer" means that it has a smaller molecular volume than an extended conventional star polymer having the same molecular weight. The conventional star polymer which is used as the base for comparison with the dense star polymer is one that has the same molecular weight, same core and monomeric components, and same number of core branches as the dense star polymer. By "extended" it is meant that the individual branches of the conventional star polymer are extended or stretched to their maximum length, e.g., as such branches exist when the star polymer is completely solvated in an ideal solvent for the star polymer. In addition, while the number of terminal groups is greater for the dense star polymer molecule than in the conventional star polymer molecule, the chemical structure of the terminal groups is the same. A "dendritic branch" is a tree-like branch which extends through at least two generations. As an illustration, an ordered second generation dendritic branch is depicted by the following configuration:

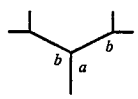

wherein "a" represents the first generation and "b" represents the second generation. An ordered, third generation dendritic branch is depicted by the following configuration:

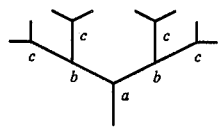

wherein "a" and "b" represent the first and second generation, respectively, and "c" represents the third generation. A primary characteristic of the ordered dendritic branch which distinguishes it from conventional branches of conventional polymers is the uniform or essentially symmetrical character of the branches as is shown in the foregoing illustrations. In addition, with each new generation, the number of terminal groups on the dendritic branch is an exact multiple of the number of terminal groups in the previous generation. Such polymers having one or more of such dendritic branches are called dendrimers Other aspects of the present invention include the use of the aforementioned ion exchange polymers and chelate ion polymers to remove ions from aqueous media with the chelate resins being particularly useful in the selective removal of heavy metal ions. The dense star ion exchange and chelation polymers exhibit surprisingly high kinetics and functional density as compared to conventional ion exchange and chelation resins with lower shrink/swell ratios.

DETAILED DESCRIPTION OF ILLUSTRATIVE EMBODIMENTS

The ion exchange and chelate resins of the present invention comprise (1) an amount of a water-insoluble substrate sufficient to immobilize the resin when it is dispersed in an aqueous medium and (2) an amount of densed star polymer sufficient to provide ion exchange and/or chelate capability as desired. Preferably, the resin contains from about 20 to about 90, most preferably from about 60 to about 80 weight percent of the water-insoluble substrate and from about 10 to about 80, most preferably from about 20 to about 40 weight percent of the dense star polymer. For purposes of this invention, "immobilize" means the rendering of a resin immobile as the aqueous medium is passed over and/or through the resin.

In the resins of this invention, a suitable water-insoluble substrate is one on which the dense star polymer can be chemically bonded or deposited such that the dense star polymer is effectively immobilized when an aqueous medium is passed over and/or through the resin. Examples of suitable water-insoluble substrates include inorganic materials such as fumed silica, alumina, titania, zeolites, clay particles and magnesium silicates. Other suitable water-insoluble substrates include latexes of various polymers wherein the latex particles have available functional groups such as halo, carboxyl, sulfo and amino. Examples of such latexes are described in U.S. Pat. No. 3,650,995 which is hereby incorporated by reference.

Preferred water-insoluble substrates include cross-linked polymers such as copolymers of styrene and divinyl benzene, bridged dendrimers which are sufficiently crosslinked to render them water-insoluble, modified polysaccharides and crosslinked poly(epichlorohydrins). Of these crosslinked polymers, crosslinked polymers of styrene and other ethylenically unsaturated hydrocarbons which have been functionalized with such groups as halomethyl, hydroxyl, aminomethyl. Halomethyl or halobenzyl are more preferred. For example, polymers containing a plurality of halomethyl, e.g., chloromethyl or bromomethyl moieties can undergo amination reactions to form aminomethyl moieties which can then be reacted with ethylenically unsaturated compounds via Michaels addition to provide functional sites suitable for reacting with or generating the dense star polymer component. Polymers containing such halomethyl moieties include, for example, polymers of chloromethylstyrene and 3-halo-1-propene, as well as polymers of monomers which can be chloromethylated subsequent to polymerization, e.g., the diverse vinyl aromatics such as styrene, vinylmethylbenzene, alkyl-substituted styrenes; halo-substituted styrenes such as bromo- or chlorostyrene; polyvinylidene aromatics such as divinylbenzene, divinyltoluene, divinylxylene, trivinylbenzene and the like; halo-olefins, particularly vinyl halides such as vinyl chloride; esters of $\alpha,\beta$-ethylenically unsaturated carboxylic acids, particularly acrylic or methacrylic acid, such as methyl methacrylate and ethyl acrylate; vinyl acetate and mixtures of one or more of said monomers. Of such polymers, the polymers of monovinylidene aromatics, particularly styrene or mixtures of styrene with a monoalkyl substituted styrene, polymers of the polyvinylidene aromatics, particularly divinylbenzene; polymers of an $\alpha,\beta$-ethylenically unsaturated carboxylic acid, particularly methyl methacrylate or combinations thereof are preferred. Particularly preferred are copolymers of styrene and divinylbenzene (DVB) and copolymers of styrene, divinylbenzene and methyl methacrylate.

Most preferably, the water-insoluble polymeric substrate employed in this invention is one such as is commonly employed in commercial ion exchange resins. Such polymers are most typically copolymers of styrene and DVB. Such styrene/DVB copolymers may be of the so-called microporous (or gel) type or may be a so-called macroporous copolymer. Said gel-type styrene/DVB copolymers generally comprise about 99.8 to about 92 weight percent styrene and about 0.2 to about 8 weight percent DVB. Relatively lightly crosslinked copolymers are generally more advantageously employed herein, e.g., copolymers containing from about 0.2 to about 5, more preferably from about 0.5 to about 3 weight percent DVB. More preferred are the so-called macroporous copolymers, which copolymers are generally prepared by the copolymerization of from about 80 to about 97 weight percent styrene with about 20 to about 3 weight percent DVB in the presence of a porogenic material such a isooctane which is soluble in the monomers but insoluble in the polymers. During the course of the polymerization of such macroporous copolymer, the newly formed polymer becomes insoluble in the porogenic material, thereby forming void spaces within the polymer structure. Of such macroporous resins, preferred are those which are crosslinked with from about 5 to about 20, more preferably 5 to 12 weight percent DVB and in which the porogenic material comprises from about 20 to about 55 percent of the combined weight of the monomers and porogenic material. Processes for preparing suitable microporous or gel polymers are taught, for example, Helfferich, *Ion Exchange*, McGraw-Hill Book Company, New York (1962). Processes for preparing the so-called macroporous copolymers useful in the present invention are taught in, for example, U.S. Pat. Nos. 3,549,562 and 3,637,535.

The foregoing polymers which do not contain the desired functional groups through which the dense star polymer can be attached or on which the dense star polymer can be generated are advantageously haloalkylated prior to attaching chelation groups according to this invention. Methods of haloalkylating the polymers and the haloalkylating agents employed in such methods are well known in the art and reference is made to U.S. Pat. Nos. 2,642,417; 2,960,480; 2,597,492; 2,597,493; 3,311,602 and 2,616,877 (all of which are hereby incorporated by reference) for purposes of illustration.

In the dense star polymer component of the ion exchange and/or chelate resin, the core of the polymer component is covalently bonded to at least 1, preferably at least 3, core branches with each core branch having a calculated length of at least 3 Angstrom units (Å), preferably at least 4 Å, most preferably at least 6 Å. These polymers preferably have an average of at least 4, more preferably at least 6 and most preferably at least 8 terminal ion exchange or chelate groups per polymer molecule. The core branches have a dendritic character, preferably an ordered dendritic character as defined hereinafter.

These dense star polymer or dendrimers preferably have two-dimensional molecular diameters in the range from about 12 to about 2,000 Å, more preferably from about 25 to about 500 Å and most preferably from about 50 to about 250 Å. For the purposes of this invention, a two-dimensional molecular diameter is determined by the following electron microscopic method. The terminal anionic groups as in the case of a cation exchange dendrimer are neutralized with stoichiometric amounts of alkali metal hydroxide. A dilute aqueous solution (e.g., about 0.5 weight percent of the neutralized dendrimer in water) of the dendrimer is placed on a beryllium grid (~1.5 millimeter diameter puddle) and allowed to evaporate. The dendrimer often exhibits dendritic like crystalline growth during the evaporation process. The diameters of the dry dendrimer molecules in two-dimensional state are then measured by electron microscopy and found to correspond closely, e.g., within 15 percent, to the diameters predicted by scaled Corey-Pauling molecular models. Such measurements are readily made using a *JEM*-1200 EX Electron Microscope sold by JEOL Corporation using CTEM techniques on a beryllium grid coated with 50 Å carbon.

The dense star polymers of this invention preferably have three-dimensional molecular diameters in the range from about 6 to about 1,000, more preferably from about 10 to about 250, most preferably from about 25 to about 125 Å. For the purposes of this invention, a three-dimensional molecular diameter is determined by calculating hydrodynamic diameters using the following Hester-Mitchell relationship, R. D. Hester et al., *J. Poly Sci.*, Vol. 18, p. 1727 (1980):

$$d = \left[\frac{240}{\pi N}\right]^{\frac{1}{3}} [M(\eta)]^{\frac{1}{3}}$$

wherein d is the hydrodynamic diameter in Å; N is $6.02 \times 10^{23}$; M is number average molecular weight of the dendrimer; $\pi$ is 3.14, and $\eta$ is intrinsic viscosity of the dense star polymer in deciliters per gram at 25° C.

The dense star polymer component of the resins of this invention differ from conventional star or star-branched polymers in that the dense star polymers have a greater concentration of terminal groups per unit of molecular volume in a three dimensional extended state than do conventional star polymers having an equivalent number of core branches and an equivalent core branch length. Thus, the density of terminal groups per unit volume in the dense star polymer in a three dimensional extended state is at least about 1.5 times the density of terminal groups in the extended conventional star polymer, preferably at least 5 times, more preferably at least 10 times, most preferably from about 15 to about 50 times. The ratio of terminal groups per core branch in the dense polymer is preferably at least 2, more preferably at least 3, most preferably from about 4 to about 1,024. Preferably, for a given polymer molecular weight, the molecular volume of the dense star polymer is less than 70 volume percent, more preferably from about 16 to about 60, most preferably from about 7 to about 50 volume percent of the molecular volume of the conventional star polymer.

In the dense star polymers, the terminal groups are groups having ion exchange capability or chelation capability or both. Any terminal group having ion exchange capability in conventional ion exchange resins is a suitable ion exchange group in the dense star, ion exchange polymers of this invention. Accordingly, such groups are capable of undergoing a reversible interchange of ions between solid and a liquid wherein there is no permanent change in structure of the polymer bonded to the ion exchange group. Similarly, any terminal group considered to be a chelating group in conventional chelation resins is a suitable chelate group in the dense star chelation polymers of this invention.

In general, groups having ion exchange capability are either cationic as in the case of ammonium, phosphonium or sulfonium or anionic as in the case of carboxylate, sulfonate, sulfate, phosphate and phosphonate. Preferred anion exchange groups are quaternary ammonium such as trialkyl, dialkyl aryl and diaryl alkyl ammoniums for strong base anion exchange dendrimers and primary, secondary or tertiary amino such as monoalkyl, dialkyl, monoaryl or diaryl amines, for weak base anion exchange dendrimer. Of these anion exchange groups, trialkyl ammoniums are the most preferred strong base groups and dialkyl amines are the most preferred weak base groups. Substituted amines and ammonium moieties are readily generated by the Eschweiler-Clarke Reaction as described in *J. Am. Chem. Soc.*, Vol. 55, p. 4571 (1933) and *The Merck Index*, Tenth Ed., ONR-28 (1983) or the Leuckart-Wallach reaction as described in *The Merck Index*, Tenth Ed., ONR-55 (1983). Preferred cation exchange groups are sulfonate for strong acid cation exchange dendrimers and carboxylate for weak acid cation exchange resins. Carboxylate moieties are formed as terminal groups on the dendrimers by alkylation of amine moieties with an ester of an α,β-ethylenically unsaturated carboxylic acid followed by hydrolysis of the ester moiety. Terminal sulfonate or phosphonate moieties are formed by an analogous reaction sequence. For example, phosphonate moieties are provided by the reaction of an amine moiety with appropriate amounts of formic acid and phosphonic acid in succession or by direct reaction of the amine moiety with chloromethylphosphonate. Sulfonate moieties are provided by a sulfomethylation reaction wherein amine moieties are reacted with a solution of formaldehyde and sodium bisulfate.

In general, groups having suitable chelating capability are groups containing donor atoms that can combine by coordinate bonding with a single metal atom to form a cyclic structure called a chelation complex or a chelate. Examples of common donor atoms are nitrogen, oxygen and sulfur, with phosphorus, arsenic and selenium, also having the capability of acting as donor atoms. Examples of suitable chelating groups include amino acids such as aminoalkyldicarboxylates, diaminoalkyldicarboxylates, diaminoalkyltricarboxylates and triaminoalkyltetracarboxylates; aminomethylphosphonates, thioetheralkyl amines and the like. Of these chelate groups, aminoalkylcarboxylates and aminomethylphosphonates are the most preferred.

The preferred dense star polymer or dendrimer components of the resins are further characterized as having a polyvalent core that is covalently bonded to at least two ordered dendritic branches which extend through at least two generations. Such ordered branching can be illustrated by the following sequence wherein G indicates the number of generations:

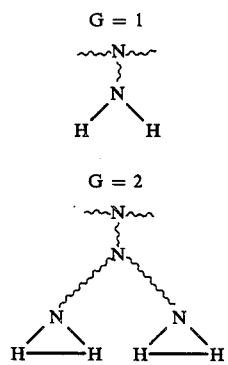

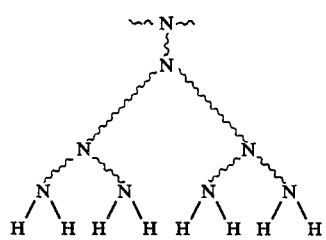

Mathematically, the relationship between the number of terminal groups on a dendritic branch and the number of generations of the branch can be represented as $$\frac{\text{\# of terminal groups}}{\text{per dendritic branch}} = \frac{N_r^G}{2}$$

wherein G is the number of generations and $N_r$ is the repeating unit multiplicity which is at least 2 as in the case of amines. The total number of terminal groups in the dendrimer is determined by the following:

$$\frac{\text{\# of terminal groups}}{\text{per dendrimer}} = \frac{N_c N_r^G}{2}$$

wherein G and $N^r$ are as defined before and $N_c$ represents the valency (often called core functionality) of the core compound. Accordingly, the dendrimers of the present invention can be represented in its component parts as follows:

$$(\text{Core})\left[(\text{Repeat Unit})\frac{N_r^G - 1}{N_r - 1}\left(\begin{array}{c}\text{Terminal}\\ \text{Moiety}\end{array}\right)^{\frac{N_r^G}{2}}\right]_{N_c}$$

wherein the Core, Terminal Moiety, G and $N_c$ are as defined before and the Repeat Unit has a valency or functionality of $N_r+1$ wherein $N_r$ is as defined before.

A copolymer dendrimer which is preferred as the dense star polymer component of the resin of this invention is a unique compound constructed of polyfunctional monomer units in a highly branched (dendritic) array. The dendrimer molecule is prepared from a polyfunctional initiator unit (core compound), polyfunctional repeating units and terminal units which may be the same or different from the repeating units. The core compound is represented by the formula ①$(Z^c)_{Nc}$ wherein ① represents the core, Z represents the functional groups bonded to ① and Nc represents the core functionality which is preferably 2 or more, most preferably 3 or more. Thus, the dendrimer molecule comprises a polyfunctional core, ① bonded to a number (Nc) of functional groups, $Z^c$, each of which is connected to the monofunctional tail of a repeating unit, $X^1Y^1(Z^1)_{N}1$, of the first generation and each of the Z groups of the repeating unit of one generation is bonded to a monofunctional tail of a repeating unit of the next generation until the terminal generation is reached. In the dendrimer molecule, the repeating units are the same within a single generation, but may differ from generation to generation. In the repeating unit, $X^1Y^1(Z^1)_{N}1$, $X^1$ represents the monofunctional tail of the first generation repeating unit, $Y^1$ represents the moiety constituting the first generation, $Z^1$ represents the functional group of the polyfunctional head of the repeating unit of the first generation and may be the same as or different from the functional groups of the core compound $(I)(Z)_{Nc}$, or other generations; and $N^1$ is a number of 2 or more, most preferably 2, 3 or 4, which represents the multiplicity of the polyfunctional head of the repeating unit in the first generation. Generically, the repeating unit is represented by the formula $X^i Y^i(Z^i)_{N^i}$ wherein "i" represents the particular generation from the first to the t-1 generation. Thus, in the preferred dendrimer molecule, each $Z^1$ of the first generation repeating unit is connected to an $X^2$ of a repeating unit of the second generation and so on through the generations such that each $Z^i$ group for a repeating unit $X^i Y^i(Z^i)_{N^i}$ in generation number "i" is connected to the tail ($X^{i+1}$) of the repeating unit of the generation number "i+1". The final or terminal of a preferred dendrimer molecule comprises terminal units, $X^t Y^t(Z^t)_{N^t}$ wherein t represents terminal generation and $X^t$, $Y^t$, $Z^t$ and $N^t$ may be the same as or different from $X^i$, $Y^i$, $Z^i$ and $N^i$ except that there is no succeeding generation connected to the $Z^t$ groups and $N^t$ may be less than two, e.g., zero or one. Therefore the preferred dendrimer has a molecular formula represented by $$( (I)(Z^c)_{N_c} ) \left[ (X^i Y^i(Z^i) N^i)_{N_c} \prod_{n=1}^{i-1} N \right] (X^t Y^t(Z^t) N^t) N_c \pi N.$$

for $i = 0$ to $t - 1$ wherein the symbols are as previously defined. The H function is the product of all the values between its defined limits. Thus $$\prod_{n=1}^{i-1} N^n = (N^1)(N^2)(N^3)(N^{i-2})(N^{i-1})$$

which is the number of repeat units, $X^i Y^i(Z^i)_{N^i}$, comprising the ith generation of one dendritic branch. In copolymer dendrimers, the repeat unit for one generation differs from the repeat unit in at least one other generation. The preferred dendrimers are very symmetrical as illustrated in structural formulas described hereinafter. Preferred dendrimers may be converted to functionalized dendrimers by contact with another reagent. For example, conversion of hydroxyl in the terminal generation to ester by reaction with an acid chloride gives an ester terminally functionalized dendrimer. This functionalization need not be carried out to the theoretical maximum as defined by the number of available functional groups and, thus, a functionalized dendrimer may not have high symmetry or a precisely defined molecular formula as is the case with the present dendrimer.

An illustration of a functionally active dendrimer of a ternary or trivalent core which has three ordered, second generation dendritic branches is depicted by the following configuration:

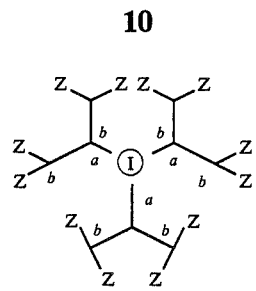

wherein $(I)$ a trivalent core atom or molecule having a covalent bond with each of the three dendritic branches, is a terminal moiety and "a" and "b" are as defined hereinbefore. An example of a polyamidoamine polyamine dendrimer of a ternary or trivalent core which has three ordered, second generation dendritic branches is represented by the following structural formula:

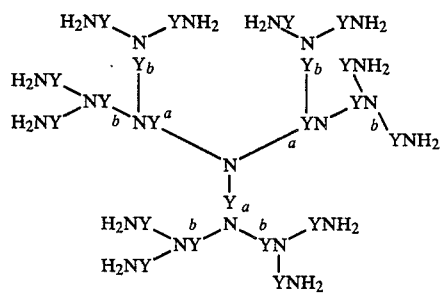

wherein Y represents a divalent amide moiety such as

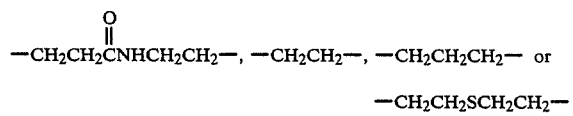

and "a" and "b" indicate first and second generations, respectively. In these two illustrations, $N_c$ is 3 and $N_r$ is 2. In the latter of the two illustrations, the repeat unit is YN. While the foregoing configuration and formulas illustrate a trivalent core, the core atom or molecule may be any polyvalent or polyfunctional moiety preferably a polyvalent or polyfunctional moiety having from 2 to about 2,300 valence bonds or functional sites available for bonding with the dendritic branches, most preferably from about 2 to about 200 valence bonds or functional sites, the higher numbered cores being characterized by linear cores such as poly(ethyleneamine) used in making rod-shaped dendrimers. Also, Y may be any other divalent organic moiety such as alkylene, alkylene oxide, alkyleneamine, and the like, with the depicted amide and alkylene moieties being the most preferred. In addition to amine, the terminal groups of the dendrimer may be any moiety that can be used to propagate the dendritic branch to the next generation. Examples of such other moieties include carboxyl, aziridinyl, mercapto, oxazolinyl, haloalkyl, oxiranyl, hydroxy and isocyanato, with amine or carboxylic ester moieties being preferred. While the dendrimers preferably have dendritic branches having 2 to 6 generations, dendrimers having dendritic branches up to 12 generations are suitably made and employed in the practice of this invention. Of course, once propagation of the dendrimer to the desired generation is achieved, the terminal group should be converted to the desired ion exchange or chelate group as defined herein.

The ion exchange or chelate resins of this invention are readily prepared by reacting a water-insoluble substrate compound that is capable of generating a polyvalent core with a compound or compounds which causes propagation of dendritic branches from the core. In one method of preparing these dendrimers, it is essential to maintain an excess of coreactant to reactive moieties in the terminal groups in the core, core adduct or subsequent adducts and dendrimers in order to prevent crosslinking and to maintain the ordered character of the dendritic branches. In general, this excess of coreactant to reactive moieties in the terminal groups is from about 2:1 to about 120:1, preferably from about 3:1 to about 20:1 on a molar basis. Illustrative teaching of this successive in excess reactant method for generating a dense star polymer on a suitable core is described in U.S. patent application Ser. No. 757,546, filed July 19, 1985 which is hereby incorporated by reference in its entirety. Also described in Ser. No. 757,546 is an alternate method, i.e., protected reactant method, for generating the desired dense star polymer on a suitable core. In this method, the water-insoluble core having suitable functional groups such as halo, tosylate, triflate, sulfate, phosphate, oxiraryl or other electrophilic moiety is reacted with a nucleophilic salt having multiple protected or masked moieties to form an adduct which is then demasked to expose nucleophilic moieties and reacted with a compound having an electrophilic moiety and a plurality of masked nucleophilic moieties. The resulting adduct which is a dendritic adduct can be demasked and further reacted to form a dense star polymer of higher generation. The terminal groups of the resulting resin are then either in the form of desired ion exchange or chelate group or can readily be converted thereto as described hereinafter.

Alternatively, the resins are prepared by first making the dense star polymers having the desired terminal ion exchange or chelate groups and then chemically reacting the resultant dense star polymers with the water-insoluble substrates. Following this method, the dense star polymers are prepared as generally described in the previous paragraph except that the core compound is a simple chemical compound such as ammonia, ethylene diamine or other similar compound which may be water-soluble. A more detailed description of the various procedures, starting materials, conditions and various resultant dense star polymers that may be employed in this method is set forth in U.S. patent application Ser. No. 641,807, filed on Aug. 7, 1984, which application is hereby incorporated by reference in its entirety. The resultant dense star polymer is then reacted with or deposited on the water-soluble substrate as illustrated hereinafter.

The following examples are given to further illustrate various embodiments of the invention and should not be construed as limiting its scope. Unless otherwise indicated, all parts and percentages are by weight.

EXAMPLE 1

A. Preparation of Macroporous Styrene/Divinylbenzene Copolymer Beads

Into a 2 gallon, jacketed, agitated pressure reactor are added 2,849 grams of deionized water, 12.3 grams of a 44 weight percent carboxymethylmethylcellulose solution, and 3.1 grams sodium dichromate. The agitator speed is adjusted to 250 rpm. To the agitated aqueous phase are added 1,321 grams of styrene, 160 grams of technical grade divinylbenzene (DVB), 1,017 grams of isooctane, 4.7 grams of a 50 weight percent t-butylperoctoate solution, and 3.1 grams of t-butylbenzoate. The mixture is heated to 80° C. with stirring for 8 hours and finished off at 110° C. for an additional 4 hours. The resulting copolymer beads are washed with deionized water and steam stripped to remove isooctane. After air drying, the copolymer is screened, retaining particles in the size range from about 250 and 425 microns in diameter. Several additional samples of copolymer beads are similarly prepared except that different amounts of divinylbenzene and isooctane as specified in Table I are employed.

B. Chloromethylation of Copolymer Beads

A 150 gram portion of the screened copolymer is placed into a 2 liter, gas-jacketed reactor along with 650 ml of chloromethylmethyl ether. The ether and the copolymer are permitted to stand together for 30 minutes, and then 30 grams of ferric chloride are added at 25° C. The reactor is heated to 50° C. and held at that temperature for 2.5 hours. The thus chloromethylated copolymer is then washed thoroughly with methanol to remove excess chloromethylmethyl ether. The beads are recovered and determined by amination with trimethyl amine to contain 4.86 milliequivalents (meq) of chloromethylated styrene per gram of copolymer. The other samples (samples 2–5) are similarly chloromethylated and the same diameters and surface areas are reported in Table I.

TABLE I

| CHLOROMETHYLATED STYRENE/DVB COPOLYMERS | | |
| --- | --- | --- |
| Sample No. | Pore Diameter (Å)[1] | Surface Area (m$^2$/g)[2] |
| 1 | 350 | 150 |
| 2 | 540 | 134 |
| 3 | 800 | 119 |
| 4 | 980 | — |
| 5 | 1328 | 58 |

[1]Pore diameter in Angstrom units is measured by mercury porismetry method.
[2]Surface area in square meters per gram is measured by mercury porisimetry method.

C. Preparation of Dense Star Polyamidoamine

Following the procedure set forth in Example 1 of U.S. Pat. No. 4,507,466, first, second and third generation dense star polyamidoamines are prepared having amine terminal groups.

D. Reaction of Dense Star Polyamine with Chloromethylated Styrene/DVB Copolymer to Produce Weak Base Anion Exchange Resin Into a liter flask equipped with a condenser and stirrer is charged a 150 gram portion of chloromethylated styrene/divinylbenzene copolymer (Sample Number 1 of Table I). To the flask is then added with stirring 700 grams of the first generation dense star polyamidoamine from part C. The resulting mixture is heated to 60° C. for 6.5 hours and the resin removed by filtration, rinsed with water and measured for weak base ion capacity to determine the degree of amination. The resin is also evaluated for protonation kinetics and shrink/swell ratios. The results are reported in Table II. As additional illustration of the invention, other resins are similarly prepared using the other copolymer beads described in Part B hereof and the other dense star polyamidoamines from Part C and then tested. The results of these tests are also reported in Table II.

Finally for purposes of comparison, additional resins are prepared by reacting the chloromethylated copolymers of Part B with dimethylamine and then similarly tested. The results of these tests are also reported in Table II.

TABLE II

| Sample No. | Copolymer[1] | Amine[2] | Capacity[3], Wet, meq/ml | Dry, meq/g | Percent Volume Expansion[3] | Kinetics[3] |
|---|---|---|---|---|---|---|
| 1 | 1 | DS-1 | 0.74 | 1.51 | 8.9 | 4.52 |
| 2 | 1 | DS-2 | 0.45 | 0.88 | 7.9 | 2.56 |
| 3 | 1 | DS-3 | 0.85 | 1.68 | 8.8 | 6.41 |
| C$_1$* | 1 | DMA | 1.42 | 4.52 | 30.1 | 2.85 |
| 4 | 3 | DS-1 | 0.82 | 2.11 | 6.7 | 9.39 |
| 5 | 3 | DS-2 | 0.36 | 1.13 | 2.8 | 9.2 |
| 6 | 3 | DS-3 | 0.63 | 1.93 | 8.1 | 11.5 |
| C$_2$* | 3 | DMA | 1.06 | 4.68 | 20.2 | 12.6 |
| 7 | 4 | DS-1 | 0.73 | 3.36 | 7.8 | 7.56 |
| 8 | 4 | DS-2 | 0.38 | 2.68 | | |
| 9 | 4 | DS-3 | 1.15 | 4.29 | 10.9 | 7.95 |
| C$_3$* | 4 | DMA | 1.05 | 4.85 | 28.4 | 14.2 |

*Not an example of the invention.
[1]Copolymer beads as indicated by Sample No. in Table I.
[2]Amine used as in Part D wherein DS-1 represents dense star polyamidomaine first generation from Part C, DS-2 from second generation dense star polyamidoamine, DS-3 from third generation dense star polyamidoamine and DMA-dimethylamine.
[3]Weak Base capacity is determined by a standard analytical method wherein 60 ml of a 5 percent solution of HCl in water is passed through to exhaustively convert resin to acid form. The bed is then rinsed with 60 ml of 0.001NNH$_4$Cl. Fifty ml of 1NNH$_4$OH is passed through the resin and the eluent is collected and titrated with silver nitrate for ionic chloride. This is then reported as weak base capacity in meq/ml. The kinetics value for each resin is determined by placing 3 ml of the resin in a 150 ml beaker and sufficient 0.1$\mu$ HCl is added to provide a chloride ion (Cl$^\ominus$) concentration that is twice the weak base capacity (wet) of the resin. Samples (100 $\mu$l) are taken at 30 second intervals over the 6 minute period following the addition of 0.1NHCl and titrated for free chloride ion. The resin is determined to have a constant (K) in liters/mole from the equation:

$$\frac{Lm_{C_B}}{C_A} = (C_{Bo} - C_{Ao})Kt + \frac{Lm_{C_{Bo}}}{C_{Ao}}$$

wherein $C_A$ is weak base capacity (mole/liter) at time (t in seconds), $C_{Ao}$ is initial weak base capacity, $C_B$ is chloride ion concentration at time (t), $C_{Bo}$ is initial Cl$^\ominus$concentration and $C_{Bo} = 2C_{Ao}$.
Shrink/swell ratio is determined by immersing 7 ml of the resin in 50 ml of 1NNH$_4$OH and then adding the mixture to excess 2NHCl to convert the resin to the acid form ($-NR^2H^+$). The volume of resin in acid and in base form is measured and the percent volume expansion is determined by the following equation:

Percent Volume Expansion = $\frac{\text{Acid Volume} - \text{Base Volume}}{\text{Base Volume}} \times 100$ As evidenced by the data of Table II, the resins (Samples 1-9) of the invention exhibit significantly lower volumes of expansion than do conventional resins (Samples C$_1$-C$_3$).

Following a standard method for measuring bulk density using a pycnometer, the resin is determined to have a bulk density of 1.1 g/ml which is significantly higher than bulk density of standard weak base resins (~1.03 g/ml).

EXAMPLE 2

A. Preparation of Dense Star Polymer

Ammonia gas is dissolved in methanol in sufficient amount to provide a 10 percent solution. A 1 liter portion of this solution is added to 40 g of methyl acrylate and the reaction is continued for 48 hours at room temperature. Following the reaction, unreacted methyl acrylate is removed from the reaction product by evaporation. To the resulting adduct of 3 moles of methyl acrylate and 1 mole of ammonia is added an excess of ethylene diamine (45:1 mole ratio) at room temperature to produce an adduct having the following formula:

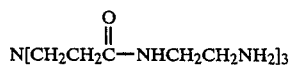

This adduct is stripped of unreacted ethylene diamine and then contacted with an excess of methyl acrylate (2.1:1 mole ratio) at room temperature. The resulting product is stripped of unreacted methyl acrylate and then contacted at room temperature with an excess of ethylene diamine (90:1 mole ratio) to form a second generation dendrimer represented by the following formula:

B. Preparation of Weak Base Resin

1. Batch Addition of Dense Star Polymer to Chloromethylated Copolymer

Chloromethylated styrene/DVB copolymers as described in Part C of Example 1 are aminated with the dense star polymers of Part A of this Example by heating the dense star polymer (neat) to 70° C. and then adding the beads copolymer to the dense star polymers which is in the form of a viscous liquid and then heating the viscous solution for 4 hours at 70° C. The resin is filtered keeping the filter funnel warm, washed in sequence by: MeOH;H$_2$O; 1M HCl; H$_2$O; 0.1M NaOH; H$_2$O, then dried at 70° C. Alternatively, the resin is prepared by dissolving the dense star polymer in a 50/50 mixture of MeOH/methylal (dimethoxymethane) so that the dense star polymer for 40 to 50 percent of the mass. This solution is added to the dry copolymer then refluxed (45° C.) for 7 to 18 hours. The resin is filtered, washed in sequence by: MeOH; H$_2$O; 0.1M NaOH; H$_2$O then dried at 70° C. In both cases the mole ratio of the dense star polymer to chloromethyl groups is greater than 5 to 1.

2. In situ Formation of Dense Star Polymer or Copolymer Beads

Using Sample Number 1 of Table I as the chloromethylated copolymer beads and DS-1 of Table II as the amine and following the procedure of Part D of Example 1, the copolymer beads are aminated to form a weak base resin having the first generation dense star polyamidoamine (DS-1) as the amine. This resin is then contacted with a 10 mole excess (based on total amine hydrogens of the resin) of methyl acrylate (MA) in methanol (50/50 by weight) at 25° C. for 12 hours. The reaction product is washed with methanol to remove unreacted MA to form the second generation ester terminated resin. IR analysis indicates that Michaels addition to the terminal amine moieties is complete, but that addition does not occur to large extent to benzylic amine. This ester terminated resin is then contacted with a 10 mole excess (based on the ester moiety of the resin) of ethylene diamine (EDA) at 30°–50° C. for 12 hours to form a second generation, amine terminated resin which is washed with methanol to remove unreacted EDA. The foregoing procedure is repeated on a portion of the second generation resin product to form a third generation resin. Each of the resins produced in Part A and B hereof are then tested for capacity, percent volume expansion and kinetics and the results are reported in Table III.

beads (Sample 1 of Table I) previously treated with KI is swelled for 1 hour in 250 ml perchloroethylene then slowly brought to reflux (121° C.) using a Dean-Stark trap to remove any lower boiling point azeotropic mixtures. A 63.5 g portion or 0.64 mole of EtOx is then added over 10 minutes and the solution refluxed for several hours. Reaction of EtOx with the copolymer beads is monitored by the EtOx disappearance from solution using NMR. After 5½ hours 40 percent of the EtOx is consumed, and the reaction mixture is cooled to room temperature. The resin is filtered, washed with methanol, then dried at 70° C. Yield is 34.24 g. Elemental analysis: C, 64.5 percent; H, 8.56 percent; N, 10.12 percent (7.22 mmole N/g). Which corresponds to 5.4 EtOx groups per chloromethyl group originally present. The degree of EtOx reaction can be increased by longer reaction times without the buildup of homopolymer until about 80 percent of the EtOx has been consumed. The polyethyleneimine (PEI) weak base resins are prepared from the polyethyloxazoline (PEtOx) resins by acid hydrolysis. Thus, a 29.34 g portion of the polyethyloxazoline resin is refluxed in 4M HCl for 3 days. The solution is cooled and the resin filtered, washed in sequence with $H_2O$; 1.0M NaOH; $H_2O$, then dried at 100° C. for 3 hours. Yield is 19.84 g and percent N=15.01 (10.7 mmole N/g). Weak base capacity is 8.5 meq/g, therefore 79.7 percent of the PEtOx is hydrolyzed to PEI.

TABLE III

| Sample No. | Preparation | Amine[1] | Capacity[2], meq/g Wet | Capacity[2], meq/g Dry | Percent Volume Expansion[1] | Kinetics[1] moles$^{-1}$ min$^1$ |
|---|---|---|---|---|---|---|
| 1 | Batch | DS-1 | 0.74 | 1.51 | 8.9 | 4.52 |
| 2 | Batch | DS-2 | 0.45 | 0.88 | 7.9 | 2.56 |
| 3 | Batch | DS-3 | 0.85 | 1.68 | 8.8 | 6.41 |
| 4 | Insitu | DS-2 | 1.80 | 3.60 | 13.6 | 2.20 |
| 5 | Insitu | DS-3 | 1.52 | 2.89 | 11.1 | 2.42 |
| C*[1] | Insitu | DMA | 1.42 | 4.52 | 30.1 | 2.85 |

*Not an example of invention.
[1]See[2] in Table II.
[2]Same as[3] in Table II.

As evidenced by the data of Table III, in situ preparation of the resin (Sample Nos. 4 and 5) significantly increases the capacity of the resin without significantly increasing the percent volume expansion of the resin as compared to similar properties for the batch resins (Sample Nos. 1–3) and the DMA control resin (Sample No. C₁)

EXAMPLE 3

A. Preparation of Precursors to Ethylenediaminepropionate and Polyethleneiminepropionate (PEIP) Chelation Resins

1. Amination with Ethylenediamine (EDA)

The dry chloromethylated copolymer (Sample 1 of Table I) is added to a large excess of ethylenediamine (≧100:1 molar) at room temperature then rapidly heated and refluxed for 3 hours. The solution is cooled and the resin filtered, washed in sequence with methanol, $H_2O$, 0.1M NaOH, $H_2O$, then dried at 100° C.

2. Preparation of Polyethyleneimine (PEI) Grafted Resins

Prior to use, ethyl oxazoline (EtOx) is dried for 2 days over a molecular sieve and then flash distilled immediately before use. The chloromethylated copolymers are backwashed with water, treated with potassium iodide, then dried at 70° C. A 10.0 g portion of copolymer

B. Preparation of Chelation Resins

1. Weak Acid Resin

A 15 g portion of a weak base resin (Example 2, Part B.1.) is added to a solution of 50 percent methanol and 50 percent methylacrylate. The solution is refluxed for 18 to 48 hours then cooled to room temperature and the resin filtered, washed with methanol then dried at 70° C. The ester groups of methylacrylate are hydrolyzed to the sodium salt of the acid by stirring ~10 g of the resin in 200 ml of 1.0M NaOH at 45° C. for 2 hours. The resin is filtered and washed with water then dried at 70° C. Use of more strenuous conditions results in amide hydrolysis in addition to ester hydrolysis. The progress of the hydrolysis is monitored using infrared spectroscopy. The resulting resin is a weak acid resin.

2. Polyethyleneiminepropionate (PEIP) Chelation Resin

A 15 g portion of the polyethyleneimine resin of Example 3, Part A.2., is added with stirring to 130 g (1.51 mole) methylacrylate at 70° C. for 20 hours. The solution is cooled and the resin filtered, washed with MeOH and dried at 70° C. Yield is 25.5 g (95.5 percent addition) of methylacrylate:PEI resin adduct. The resulting resin is then hydrolyzed by refluxing 20.0 g of the resin in 500 ml of 3M NaOH for 18 hours. The solution is cooled, washed with water then dried at 110° C. Yield is 20.6 of polyethyleneiminepropionate (PEIP) resin (percent Na is 9.7 [90.5 percent hydrolyzed]).

3. Ethylenediaminepropionate Chelation Resins

A 19.04 g portion of ethylenediamine resin (Example 3, Part A.1.) is added to 136 g (1.58 mole) MA and heated at 70° C. for 18 hours. The solution is cooled and the resin filtered, washed with MeOH then dried at 70° C. Yield is 28.17 g (0.096 mole MA added) of methylacrylate/EDA resin adduct. The resulting resin is then hydrolyzed by adding 20.14 g of the resin to 700 ml of 1M NaOH and heated at 70° C. for 18 hours. The solution is cooled and the resin filtered, washed with water and dried at 110° C. Yield is 20.12 g of ethylenediaminedipropionate resin (percent Na is 6.2 [80 percent hydrolyzed]). The hydrolysis can be increased to >90 percent by refluxing in 3M NaOH for several hours.

EXAMPLE 4

Evaluation of Chelation Resins

Several dense star chelation resins (Generations 1.5, 2.5 and 3.5) are prepared by the addition of MA to the dense weak base resins described in Example 1 followed by hydrolysis using aqueous NaOH. The uptake of $Ca^{2+}$ and $Mg^{2+}$ from a synthetic brine solution containing 100 ppm $Ca^{2+}$, 104 ppm $Mg^{2+}$ and 2.00 percent total dissolved salts (TDA) is monitored using inductively coupled plasma (ICP) optical emission spectroscopy. [a]The results from these studies are given in Table IV.

sites per gram of silica. The dendrimer is amine ($-NH_2$) terminated and is prepared using ammonia as the core and methylacrylate and ethylenediamine to form generations by following the procedure and conditions described in Example 1. The addition fraction is carried out in the following manner:

In to a 4 l reactor at ambient temperature, 50 g of silica are fluidized. The dendrimer-chloroform solution is added in two additions through a syringe needle with the end bent to form a spray. The first ~⅓ of the solution is delivered and allowed to mix for 30 minutes before subsequent spraying of the remaining ⅔ followed by 40 minutes mixing. The resultant material, a white fluffy solid, is placed in an open evaporating dish and the chloroform allowed to evaporate. This process is complete ~4 hours. The material is sieved through a 30 mesh screen. (230 μm opening).

Infrared analysis of the resulting dendrimer/silica adduct shows unreacted silanol sites, thus indicating that the dendrimer is bonded only at selected sites on the silica.

B. Evaluation of Chelation Resin

A sample of anhydrous $CuSO_4$ (0.15 g 10.939 mmoles) is dissolved in 10 ml of deionized water. A 3 ml sample of the $CuSO_4$ solution is set aside as a reference. To a 0.75 g sample of above dendrimer/silica adduct is added the remaining $CuSO_4$ solution (7 ml) to give a deep blue floc. Filtering the blue floc provides a very light blue colored filtrate. Colorimetric comparison of this filtrate with the reference sample showed that the copper concentration is reduced by over 87 percent. Resuspending the blue filter cake obtained above in 5 ml

TABLE IV

| Sample No. | Copolymer[1] | Amine[2] | Flow Rate[3] ml/min | Capacity[4] meq/ml | $Ca^{+2}$ Uptake[5] Capacity mg/ml | $Ca^{+2}$ Uptake[5] Leakage PPB | $Mg^{+2}$ Uptake[5] Capacity mg/ml | $Mg^{+2}$ Uptake[5] Leakage PPB |
|---|---|---|---|---|---|---|---|---|
| 1 | 1 | DS-1B | 4 | 0.74 | 0.35 | 670–1250 | 0.34 | 400–1000 |
| 2 | 3 | DS-1B | 12 | 0.82 | 0.17 | ~100 | 0.14 | ~100 |
| 3 | 1 | DS-3B | 12 | 0.85 | 0.42 | 350–600 | 0.31 | 300–500 |
| 4 | 1 | DS-2I | 12 | 1.80 | 1.05 | 170–300 | 0.79 | 200–370 |
| 5 | 1 | DS-3I | 12 | 1.52 | 2.41 | 150–400 | 1.99 | 120–450 |
| C*[1] | 1 | EDA | 12 | 2.71 | 2.48 | 400–500 | 1.64 | 320–600 |
| C*[1] | 1 | PEI | 12 | 1.32 | 4.24 | 150–170 | 3.24 | 50–150 |

*Not an example of the invention.
[1]Copolymer bead component wherein sample no. is as indicated in Table I
[2]Amine component which is reacted with methylacrylate wherein:
DS-1B represents a first generation dense star polymer as in Table II prepared by batch method;
DS-3B represents a third generation dense star polymer as in Table II prepared by batch method;
DS-2I represents a second generation dense star polymer as in Table III prepared by the insitu method;
DS-3I represents a third generation dense star polymer as in Table III prepared by the insitu method;
EDA represents ethylenediamine as added to the chloromethylated copolymer bead;
PEI represents polyethyleneimine as added to the chloromethylated copolymer bead.
[3]Flow rate of Ca/Mg liquor (104 ppm $Mg^{+2}$ and 100 ppm $Ca^{+2}$ and 2 percent total dissolved salts [$MgSO_4$, $CaCl_2$, NaCl]) wherein resin volume is ~20 ml.
[4]Capacity of resin as weak base resin as determined by method described in 3 of Table II.
[5]$Ca^{+2}$ and $Mg^{+2}$ capacity determined by method of (a) G. A. Meyer and H. R. Frable, "Determination of Calcium and Magnesium in Effluents Containing High Salt Levels by Emission Spectroscopy," ML-AL 83-122296 (10/17/83).

As evidenced by the data shown in Table IV, the resins of this invention can selectively remove $Ca^{++}$ and $Mg^{++}$ from a brine stream containing predominately alkali metals.

EXAMPLE 5

A. Preparation of Chelation Resin

A 8.06 g portion (0.759 mmoles) of a 5th generation polyamidoamine dendrimer (Mn=10,619) dissolved in 65.07 g of chloroform is added to 50 g of fluidized silica having a surface area of 200±25 m²/g, average particle diameter of 200 μm, a bulk density of ~2.3 lbs/ft³ (~37 kg/m³) and ~13.3×10⁻⁴ moles of free surface silanol of deionized water caused copper sulfate to re-equilibrate with the fresh supernatant over a period of several days to provide a controlled delivery of $Cu^{++}$ for suppression of algae and aquatic microorganisms growth.

EXAMPLE 6

Into a 20-ml vial are charged 0.28 g of a second generation polyamidoamine ($NH_3$/MA/EDA) dendrimer having methylacrylate terminal groups ($\overline{M}_n$ of 2804). 0.32 g of a third generation dendrimer similar to DS-3 of Table II, to give a colloidal, opaque paste. Adding 2 ml of $CDCl_3$ causes a portion of the dendrimer mixture to dissolve, however, it is necessary to add ≃0.5 ml of MeOH to get a totally homogeneous solution. A film (≃1 mil) of this reaction mixture is cast on (a) an infrared salt plate and (b) on a Teflon plate* infrared analysis over a period of 65 hours. Ratios of ester (1730 cm$^{-1}$) to amide (1652 cm$^{-1}$) bands are determined. The ester band (1730 cm$^{-1}$) dramatically (≃10 percent; ≃0.5 percent/hour) during the first 21 hours (100°) with concurrent formation of amide band (1652 cm$^{-1}$). After that time, loss of ester levels out at ≃0.2 percent/hour and continues at that rate after 65 hours/100°. The film is removed from the Teflon plate after 30 hours, dissolved/slurried in water and filtered through an XM-300 filter (≃800 Å±; $\overline{M}$≃300,000, cut off) obtained from Amicon Corp., Lexington, Mass. The filtrate is refiltered through an SM-100 filter (≃50 Å: $\overline{M}_n$≡100,000, cut off) and the retained sample portion is diluted with methanol and examined by electron microscopy. Using the method of Richardson[1] and Quayle[2], the sample is sprayed on a carbon coated (50 Å), beryllium grid and examined by a Philips 400 TEM microscope. Electron micrographs show the major population consists of dendrimer aggregates with cross-sectional dimensions of ≃400–600 Å and show an aggregate population range of ≃100–600 Å. The Corey-Pauley model measured dimensions supports the dimensions observed for the rims and linear appendages present in the aggregates. The cavitation which develops, appears to be a function of the packing efficiency of the dendrimer spheroids, giving voids which may be resulting from hexagonal-/octagonal type packing. Three of the cavities have dimensions of ≃50/60 Å × 100 Å and support this packing scheme. Because of the (a) high surface areas and (b) size selective bridged dendrimers cavitations that can be designed into these matrices, these poly (dense star polymers) are useful as ion exchange, bioparticle affinity resins, size selective catalysts, chiral surfaces for both chiral resolution and induction, synthetic enzyme mimics or membranes, whether used as films, beads, gels or other fabricated forms.

* These samples are placed in an oven at 100° and monitored by infrared analysis.
[1] M. J. Richardson, Proc. Roy. Soc.; A, 229, 50 (1964).
[2] D. V. Quayle, Nature Lond., 209, 5025 (1966).

EXAMPLE 7

Conversion of Bridged Dendrimer to Weak Base Resin

A 1.0 g sample of the bridged dendrimer of Example 6 is suspended in 25 g of ethylenediamine dissolved in 25 ml of methanol. This reaction mixture is stirred at room temperature for 1 day and stripped of volatiles. Devolatilization is accomplished by bubbling dry N$_2$ through the crude product while under vacuum (≃1-2 mmHg). The light yellow, gel-like solid is found to possess no ester absorption (γ=1730 cm$^{-1}$) by infrared analysis. This product (1.0 g) is suspended in a copper sulfate solution (0.3 g, 20 ml of D.I. H$_2$O) and stirred at room temperature for 2 days. After that time, the bridged dendrimer gel has absorbed a substantial amount of copper ion as evidenced by the deep purple color of the gel and a dramatic decrease in color of the supernatant liquid. Resuspending the Cu$^{+2}$ complexed gel (density>1.0) with fresh D.I. water shows that detectable amounts of Cu$^{+2}$ re-equilibrated with the fresh supernatant. These prototypes can be used as controlled release matrices for liberating adequate levels of Cu$^{++}$ to control algae or other aqueous microorganisms.

EXAMPLE 8

Conversion of Bridged Dendrimer to Total Acid Form

A 0.5 g sample of the bridged dendrimer of Example 6 is suspended in 10 g of methyl acrylate dissolved in 15 ml of methanol. This reaction mixture is stirred at room temperature for 1 day and stripped of volatiles by entraining dry N$_2$ through the crude product while under vacuum (≃1-2 mm of Hg). A stoichiometric amount of sodium hydroxide dissolved in a 50/50 by weight solvent mixture of MeOH/H$_2$O is used to hydrolyze the ester terminated bridged dendrimer to carboxylic acid form (chelate resin). Progress of each step in this reaction sequence was monitored by infrared analysis. These resins are used effectively as chelation resins for sequestering Ca$^{++}$ and Mg$^{++}$ ions.

What is claimed is:

1. An ion exchange resin comprising a normally solid, water-insoluble substrate having deposited thereon or chemically bonded thereto a dense star polymer in an amount effective to enable the resin to function as an ion exchange resin, said dense star polymer having at least one dendritic branch emanating from a core, each dendritic branch having at least two terminal ion exchange moieties provided that (1) the ratio of terminal groups to the branches emanating from the core is 2:1 or greater, (2) the density of terminal groups in the dense star polymer is at least 1.5 times that of an extended conventional star polymer having similar core and monomeric moieties and a comparable molecular weight and number of core branches wherein each of such branches of the extended conventional star polymer bears only one terminal group, (3) a molecular volume that is equal to or less than 80 percent of the molecular volume of said extended conventional star polymer, and (4) the two-dimensional molecular diameter of the dense star polymer is in the range from about 12 to about 2000 Angstroms.

2. The resin of claim 1 wherein the dense star polymer has (1) at least 3 dendritic branches per core, (2) a terminal group density at least 5 times that of the corresponding extended conventional star polymer, (3) a molecular volume that is equal to or less than 60 percent of the volume of the extended conventional star polymer, and (4) the two-dimensional molecular diameter of the dense star polymer is in the range from about 25 to about 500 Angstroms.

3. The resin of claim 1 wherein the dense star polymer is a dendrimer having a polyvalent core that is covalently bonded to at least 1 ordered dendritic branch which extends to two generations such that each dendritic branch has at least four terminal ion exchange moieties and a symmetrical structure.

4. The resin of claim 1 wherein the core of the dense star polymer is derived from a nucleophilic compound.

5. The polymer of claim 4 wherein the nucleophilic compound is an amine having a plurality of amine hydrogens.

6. The resin of claim 1 wherein the dense star polymer having at least 3 dendritic branches per core.

7. The resin of claim 3 wherein the dense star polymer was at least 3 dendritic branches per core.

8. The resin of claim 1 herein the dense star polymer is a dendrimer represented by the formula:

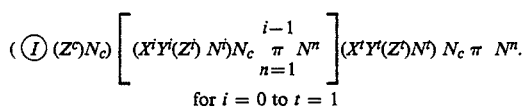

for $i = 0$ to $t = 1$ wherein ① is a polyfunctional core, $Z_c$ is a functional group bonded to the core and an X group of the first generation, $N_c$ is the number of functional groups bonded to the core, $X^i$ is a monofunctional tail of a repeating unit $Y^i$ of the i generation which is bonded to $Y^i$ and a Z group of the $i-1$ generation, $Z^i$ is a functional group bonded to $Y^i$ and a X group of the $i+1$ generation, $N^i$ is a number of at least 2 which corresponds to the multiplicity of the polyfunctional head of $Y^i$, $\pi$ is the product function, $N^{i-1}$ is a number of at least 2 which corresponds to the multiplicity of the polyfunctional head of $Y^{i-1}$ wherein $Y^{i-1}$ is a repeating unit of the $i-1$ generation, $X^t$ is the monofunctional tail of a repeating unit $Y^t$ of the terminal generation, $Z^t$ is a terminating group bonded to $Y^t$, $N^t$ is zero or a number which corresponds to the number of $Z^t$ groups bonded to one $Y^t$ group, i represents a number of a particular generation in a series from 1 to a number from 1 to t-1, provided that (1) all $X^i Y^i (Z^i)_{N^i}$ are the same within a generation and may be the same or different in different generations and (2) all $X^t Y^t (Z^t)_{N^t}$ of the terminal generation are the same.

9. The resin of claim 8 wherein t is 2 or more and $N^t$ is at least one.

10. The resin of claim 8 wherein t is 3 or more and $N_t$ is at least two.

11. The resin of claim 1 wherein the dendritic branches contain amidoamine linkages.

12. The resin of claim 1 wherein the core is derived from a nucleophilic compound and the branches are polyamidoamines wherein the terminal groups are primary amine groups.

13. The resin of claim 1 wherein the nucleophilic core is derived from a core compound having a plurality of active hydrogens capable of undergoing a Michaels addition reaction with an ethylenically unsaturated group.

14. The resin of claim 11 wherein the nucleophilic compound is an amine having a plurality of amine hydrogens.

15. The resin of claim 11 wherein the branches are polyamidoamine which is derived from the reaction of an alkyl ester of an $\alpha,\beta$-ethylenically unsaturated carboxylic acid or an $\alpha,\beta$-ethylenically unsaturated amide and an alkylene polyamine or a polyalkylene polyamine.

16. The resin of claim 15 wherein the nucleophilic compound is ammonia, the ester is methyl acrylate and the polyamine is ethylenediamine.

17. The resin of claim 1 wherein the dense star polymer is an amidoamine dendrimer which is represented by the formula:

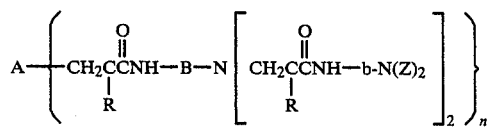

wherein A is a n-valent core derived from a nucleophilic compound, R is hydrogen or lower alkyl, B is a divalent moiety capable of linking amine groups, n is an integer of 3 or more corresponding to the number of the core branches and Z is hydrogen or

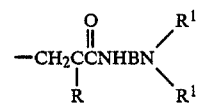

wherein $R^1$ is hydrogen or

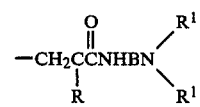

provided that the dendrimer has not more than 20 generations wherein each generation is represented by

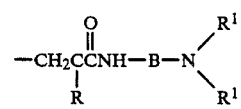

18. The resin of claim 17 wherein A is

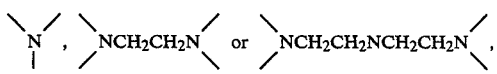

R is hydrogen or methyl; B is the divalent residue of a polyamine, n is an integer from 3 to 8, and Z is

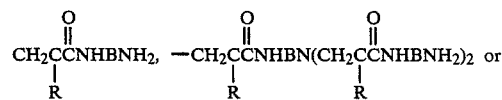

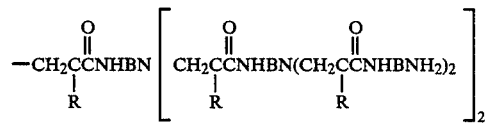

19. The resin of claim 1 wherein the substrate is a copolymer of styrene and divinyl benzene in the form of macroporous beads.

20. The resin of claim 1 wherein the substrate is an inorganic particulate solid.

21. The resin of claim 20 wherein the inorganic solid is silica.

22. A chelate resin comprising a normally solid, water-insoluble substrate having deposited thereon and/or chemically bonded thereto a dense star polymer in an amount effective to enable the resin to function as a chelate resin, said dense star polymer having at least one core branch emanating from a core, each core branch having at least one terminal group provided that (1) the ratio of terminal groups to the branches emanating from the core is 2:1 or greater, (2) the density of the terminal groups in the dense star polymer is at least 1.5 times that of an extended conventional star polymer having similar core and monomeric moieties and a comparable molecular weight and number of core branches wherein each of such branches of the extended conventional star polymer bears only one terminal group, (3) a molecular volume that is equal to or less than 80 percent of the molecular volume of said extended conventional star polymer, and (4) the two-dimensional molecular diameter of the dense star polymer is in the range from about 12 to about 2000 Angstroms.

* * * * *